(12) United States Patent
Park

(10) Patent No.: US 10,113,091 B2
(45) Date of Patent: Oct. 30, 2018

(54) ADHESIVE FOR HYDROPHOBIC OR WATER-REPELLENT SUBSTRATE AND MANUFACTURING METHOD THEREOF

(71) Applicant: KOLON GLOTECH, INC., Gwacheon (KR)

(72) Inventor: Jae-Kuk Park, Yongin (KR)

(73) Assignee: KOLON GLOTECH, INC., Gwacheon (KR)

( * ) Notice: Subject to any disclaimer, the term of this patent is extended or adjusted under 35 U.S.C. 154(b) by 301 days.

(21) Appl. No.: 14/954,716

(22) Filed: Nov. 30, 2015

(65) Prior Publication Data

US 2016/0160099 A1 Jun. 9, 2016

(30) Foreign Application Priority Data

Dec. 3, 2014 (KR) .................. 10-2014-0172087

(51) Int. Cl.
  *C09J 163/00* (2006.01)
  *C09D 163/00* (2006.01)

(52) U.S. Cl.
  CPC .......... *C09J 163/00* (2013.01); *C09D 163/00* (2013.01); *C08K 2201/005* (2013.01); *C08K 2201/011* (2013.01)

(58) Field of Classification Search
  CPC ....... C08L 63/00; C09J 163/00; C09D 163/00
  USPC .................................................. 523/440, 443
  See application file for complete search history.

(56) References Cited

U.S. PATENT DOCUMENTS

| 4,994,534 A * | 2/1991 | Rhee .................. C08F 2/44 523/330 |
| 5,151,454 A * | 9/1992 | Goto .................. C08F 283/00 522/93 |
| 6,844,073 B1 * | 1/2005 | Helmeke .............. C08G 18/12 428/423.1 |
| 2011/0174437 A1 * | 7/2011 | Fromwiller ........ C08G 18/4202 156/307.7 |

FOREIGN PATENT DOCUMENTS

| JP | 2002-363526 A | 12/2002 |
| JP | 2006-225544 A | 8/2006 |
| JP | 2007-169510 A | 7/2007 |
| JP | 2008-50389 A | 3/2008 |
| JP | 2012-131847 A | 7/2012 |
| KR | 10-2012-0085312 A | 7/2012 |

\* cited by examiner

*Primary Examiner* — Michael J Feely

(57) ABSTRACT

Disclosed is an adhesive composition for hydrophobic or water-repellent substrate comprises an epoxy resin, a modified urethane resin, an inorganic filler in nanoparticle form, and a dilution solvent. The adhesive composition according to the present invention can be employed to be adhered the same or different materials or print pattern on a hydrophobic or water-repellent substrate.

17 Claims, No Drawings

ADHESIVE FOR HYDROPHOBIC OR WATER-REPELLENT SUBSTRATE AND MANUFACTURING METHOD THEREOF

CROSS-REFERENCE TO RELATED APPLICATIONS

This application claims priority to and the benefit of Korean Patent Application No. 10-2014-0172087 filed in the Korean Intellectual Property Office on Dec. 3, 2014, the entire contents of which are incorporated herein by reference.

TECHNICAL FIELD

The present invention relates to an adhesive composition for a hydrophobic or water-repellent substrate and a manufacturing method thereof. Specifically, the present invention relates to an adhesive composition and a manufacturing method thereof, which are employed to be adhered the same or different materials or print pattern on a hydrophobic or water-repellent substrate.

BACKGROUND ART

With improvement of the standard of living and increment of outdoor sports and leisure activities, the demands for high-performance clothes have been increased in a recent year. These clothes require functionalities like a water-proofing, a moisture-permeability, a warm-keeping, and a fast-drying, these functionalities may be used alone or in combination, and thereby the users provide more comfortable feel and sensation. In particularly, breathable and water-proofing fabrics have been widely used in the field of mountain-climbing equipment such as mountain clothes, sleeping bag, caps, and gloves and sports clothes such as outdoor clothes, sweat-suits, ski-suits, and golf-suits. Conventional breathable and water-proofing fabrics were manufactured using polytetra-fluoroethylene (PTFE) film and surface thereof has hydrophobic or water-repellent. With development of world-wide leisure market, hydrophobic polyester fabrics having multi-nano layers have been highlighted as functional cloth materials used in clothes for outdoors or sports. These days, there are increasingly requirements for improving functionality by bonding the same or different materials on hydrophobic or water-repellent fabrics. Also, the needs for embodying various patterns and colors have been increased using screen printing on hydrophobic or water-repellent fabrics.

Meanwhile, it was recently reported that it is very difficult for the same or different materials to be adhered to hydrophobic or water-repellent substrates (for example, hydrophobic fabrics or plastics coated with silicone) using a conventional adhesive. In specifically, surface modification is required for forming 3D patterns using screen printing technique on clothes having hydrophobic or water-repellent, thereby causing complex process.

SUMMARY OF THE INVENTION

The present invention has been made in an effort to provide an adhesive and a manufacturing method thereof, which are employed to be adhered the same or different materials or print pattern on a hydrophobic or water-repellent substrate.

An exemplary embodiment of the present invention provides an adhesive composition for hydrophobic or water-repellent substrate comprising an epoxy resin, a modified urethane resin, an inorganic filler in nanoparticle form, and a dilution solvent, wherein the modified urethane resin has an ethylenically-unsaturated group at its end.

Another exemplary embodiment of the present invention provides a method of manufacturing an adhesive composition for hydrophobic or water-repellent substrate comprising the steps of: (a) producing a modified epoxy resin by reacting an epoxy resin having at least one or more hydroxyl group with an isocyanate compound or an amine compound having at least one or more hydroxyl group in the presence of an alcohol, and preparing a modified epoxy resin solution by mixing the modified epoxy resin and a dilution solution; (b) producing a modified urethane resin by reacting an urethane resin having an isocyanate group at its end with a compound having an ethylenically-unsaturated group, and preparing a modified urethane resin solution by mixing the modified urethane resin and a dilution solution; (c) producing a first composition by mixing the modified epoxy resin solution and the modified urethane resin, or producing a first composition comprising a reaction product obtained by mixing the modified epoxy resin solution and the modified urethane resin; and (d) producing a second composition by adding and mixing an inorganic filler in nanoparticle form to the first composition.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Hereinafter, the present invention will be described in detail with reference to the drawings. In describing the present invention, detailed descriptions related to publicly known functions or configurations will be omitted in order not to obscure the gist of the present invention.

In accordance with one aspect, the present invention provides an adhesive composition capable of bonding the same or different materials or printing patterns on a substrate having a hydrophobic or water-repellent surface. The adhesive composition according to the present invention comprises an epoxy resin, a modified urethane resin, an inorganic filler in nanoparticle form, and a dilution solvent. Each component of the adhesive composition for the hydrophobic or water-repellent will be described in detail hereinafter.

Epoxy Resin

An epoxy resin as a component of the adhesive composition is not particularly limited, and may be bisphenol-A epoxy resin, bisphenol-F epoxy resin, bisphenol-S epoxy resin, phenol novolak resin, cresol novolak epoxy resin, bisphenol-A novolak epoxy resin, bisphenol-F novolak epoxy resin, alicyclic epoxy resin, glycidyl ester epoxy resin, glycidyl amine epoxy resin, hydantoin epoxy resin, isocyanurate epoxy resin, aliphatic chain epoxy resin, phenoxy resin, and so on. These epoxy resins may be halogenated or hydrogenated. In addition, these epoxy resins may be used alone, or two or more thereof may be used in combination.

Preferably, the epoxy resin is a phenoxy resin. Since the phenoxy resin has a number of hydroxyl groups in its molecule, it can form an isocyanate group, a cyanate ester group, or an oxazolidone ring by reacting with an isocyanate compound or an amino alcohol compound. Also, the hydroxyl group of phenoxy resin is combined with a modified urethane resin after-mentioned, and thereby an adhesive layer is easily formed on a substrate. The phenoxy resin used in the present invention is not particularly limited, and may be used bisphenol-A phenoxy resin, bisphenol-A/bisphenol-F phenoxy resin, brominated phenoxy resin, phosphorus-based phenoxy resin, bisphenol-A/bisphenol-S phenoxy resin, caprolactone modified phenoxy resin, siloxane modified phenoxy resin, and so forth. Among these resins, bisphenol-A phenoxy resin is preferable for the eco-friendly, compatibility and curability. The phenoxy resin can be obtained commercially. Examples of the resin include YP-70, YP-50EK35, YP-50, and so forth manufactured by kukdo chemical company (Republic of Korea), YX-4000, YX-8100BH30, YX-6954BH30, and YL-6121H manufactured by Japan epoxy resin company, PKHH, PKHJ, and PKHP manufactured by InChemInvestment in Chemicals, and so on.

In addition, it is more preferable that the epoxy resin is a modified epoxy resin comprising at least one or more isocyanate group, cyanate ester group, or oxazolidone ring. The modified epoxy resin may be formed by be reacting the epoxy resin having at least one or more hydroxyl group like phenoxy resin with an isocyanate compound or an amine compound having at least one or more hydroxyl group.

The isocyanate group modified epoxy resin, the cyanate ester group modified epoxy resin, or the oxazolidone ring modified epoxy resin according to the present invention will be described in a method of manufacturing an adhesive in detail hereinafter.

Modified Urethane Resin

A modified urethane resin as a component of the adhesive composition comprises an ethylenically unsaturated group at terminal, preferably, both terminals thereof. Such modified urethane resin may be obtained by reacting a urethane resin having isocyanate group at both ends thereof with a compound having ethylenically unsaturated group. In this case, the ethylenically unsaturated group is preferably an acryloyl group or a methacyloyl group. The ethylenically unsaturated group of the present invention will be described in the method of manufacturing the adhesive in detail hereinafter.

Additionally, the modified urethane resin has been combined with the epoxy resin through the hydroxyl group or the epoxy group in the epoxy resin, preferably.

More preferably, the modified urethane resin has been combined with the modified epoxy resin through the isocyanate group, the cyanate ester group, or the oxazolidone ring in the modified epoxy resin.

Dilution Solvent

A dilution solvent as a component of the adhesive composition controls the viscosity of the adhesive composition to impart proper coating properties to the adhesive composition. The dilution solvent is used as reaction solvent in coupling the epoxy resin with the modified urethane resin. The dilution solvent of the present invention is not particularly limited if it can homogeneously disperse or dissolve the epoxy resin or the urethane resin. For example, the dilution of the present invention may be one or more selected from the group consisting of ethylene glycol, propylene glycol, diethylene glycol, di-propylene glycol, tri-ethylene glycol, hexylene glycol, 1,5-pentanediol, ethylene-glycol mono-ethyl-ether, ethylene-glycol mono-butyl-ether, di-ethylene-glycol mono-methyl-ether, di-ethylene-glycol mono-ethyl-ether, di-ethylene-glycol mono-butyl-ether, propylene-glycol mono-methyl-ether, propylene-glycol mono-ethyl-ether, propylene-glycol mono-butyl-ether, di-propylene-glycol mono-methyl-ether, di-propylene-glycol mono-ethyl-ether, di-propylene-glycol mono-butyl-ether, di-ethylene-glycol di-methyl-ether, di-propylene-glycol di-methyl-ether, formic amide, mono formic amide, di-methyl formic amide, mono-ethyl formic amide, di-ethyl formic amide, acetamide, mono-methyl acetamide, N-methyl pyrrolidon, N-ethyl pyrrolidon, N,N-dimethyl formic amide, N,N-dimethyl acetamide, di-methylsulphoxide, di-methyl sulfone, di-methyl sulfone, bis (2-hydroxy sulfone), tetra-methylene sulfone, acetone, methyl-ethyl-ketone, methyl-isopropyl ketone, methyl isoethyl ketone, methyl isobutyl ketone, cyclohexanone, pentane, hexane, dodecane, tetradecane, bezene, tri-methyl bezene, butyl benzoate, dodecyl, xylene, toluene, tetrahydrofuran, 1,4-dioxan, and tetrahydrofuran, 1,3-dioxane, methanol, ethanol, n-propanol, isopropyl alcohol, n-butanol, hexanol, nonanol, cyclo hexanol, benzyl alcohol, 2-methoxy-ethanol, 2-butoxy-ethanol, α-terpinol, benzyl alcohol, 2-hexyldecanol, 3-methoxy propanol, ethylene cellosolve, butyl cellosolve, methyl carbitol, butyl carbitol, hexyl carbitol, methyl acetate, ethyl acetate, ethyl lactate, n-propyl aetate, isopropyl aetate, ethyl propionate, butyl acetate, isobutyl acetate, di-ethyl adipate, di-ethylphthalate, di-ethylene glycol mono-butyl acetate, ethylene glycol mono-methyl ether acetate, ethylene glycol mono-butyl acetate, propylene glycol mono-methyl ether acetate, propylene glycol mono-ethyl-ether acetate, and 3-methoxy propyl acetate.

Inorganic Filler in Nanoparticle Form

An inorganic filler in nanoparticle form as a component of the adhesive composition controls the surface energy of the adhesive composition to perform function to homogeneously coat and improve adhesion. The inorganic filler in nanoparticle form of the present invention is not limited to any particular filler. For instance, the inorganic filler may be selected from the group consisting of silica, calcium carbonate, aluminum hydroxide, magnesium hydroxide, titania, alumina, and zirconia. Considering compatibility and reactivity with the epoxy resin and the urethane resin, the inorganic filler is preferably a silica. In addition, the particle size of the silica is preferably less than 20 nm (for example, 1~20 nm), and more preferably 10 nm (for example, 1~10 nm).

Content Relation of Components in the Composition

The weight ratio of the epoxy resin versus the modified urethane resin in adhesive composition is not particularly limited, and it is preferable that the epoxy resin is used as main materials for coating property, drying property, and adhesion. For instance, the weight ratio of the epoxy resin versus the modified urethane resin in the adhesive composition is preferably 9:1 to 6:4, more preferably 9:1 to 7:3.

Preferably, the content of the epoxy resin or the modified epoxy resin in the adhesive composition is ranged from 15 to 45% by weight, and more preferably from 20 to 40% by weight. The content of the modified urethane resin in the adhesive composition is preferably ranged from 2 to 20% by weight, and more preferably from 2 to 10% by weight. The content of the inorganic filler in nanoparticle form in the adhesive composition is preferably ranged from 0.1 to 4% by weight, and more preferably from 0.5 to 2% by weight.

Other Components

The adhesive composition according to the present invention may further comprises a supplement additives besides the epoxy resin (or the modified epoxy resin), the modified urethane resin, and the dilution solvent. The supplement additives may be selected from antioxidant, sunscreen composition, dispersant, and plasticizer, and so on. The content of the supplement additives is preferably ranged from 0.1 to 5% by weight, and more preferably from 1 to 4% by weight.

In accordance with another aspect, the present invention provides a method of manufacturing an adhesive composition employed to bond the same or different materials or print pattern on a hydrophobic or water-repellent substrate.

According to an exemplary embodiment of the present invention, the method comprises the steps of preparing an epoxy resin solution comprising an epoxy resin and a dilution solvent; preparing a modified urethane resin solution comprising a modified urethane resin having ethylenically unsaturated group at its terminal and a dilution solvent; and producing a composition by mixing the epoxy resin solution, the modified urethane resin solution and an inorganic filler in nanoparticle form or a composition comprising a reaction product obtained by mixing the modified epoxy resin solution, the modified urethane resin and the inorganic filler in nanoparticle form.

According to another exemplary embodiment of the present invention, the method comprises the steps of preparing an epoxy resin solution comprising an epoxy resin and a dilution solvent; producing a first composition by mixing the epoxy resin solution and a modified urethane resin or a first composition comprising reaction product after mixing; and producing a second composition by adding and mixing an inorganic filler in nanoparticle form to the first composition.

According to still another exemplary embodiment of the present invention, the method comprises the steps of preparing a modified epoxy resin solution comprising a modified epoxy resin having one or more isocyanate group, cyanate ester group, or oxazolidone ring and a dilution solvent; preparing a modified urethane resin solution comprising a modified urethane resin having ethylenically unsaturated group at its terminal and a dilution solvent; and producing a composition by mixing the modified epoxy resin solution, the modified urethane resin solution and an inorganic filler in nanoparticle form or a composition comprising reaction product after mixing.

According to yet another exemplary embodiment of the present invention, the method comprises the steps of preparing a modified epoxy resin solution comprising a modified epoxy resin having one or more isocyanate group, cyanate ester group, or oxazolidone ring and a dilution solvent; preparing a modified urethane resin solution comprising a modified urethane resin having ethylenically unsaturated group at its terminal and a dilution solvent; and producing a first composition by mixing the modified epoxy resin solution and the modified urethane resin or a first composition comprising reaction product after mixing; and producing a second composition by adding and mixing an inorganic filler in nanoparticle form to the first composition. Hereinafter, the method for manufacturing the adhesive composition for hydrophobic or water-repellent substrate according to a preferable embodiment will be described step by step.

Preparing Modified Epoxy Resin Solution

The step of preparing the modified epoxy resin according to the method for manufacturing the adhesive composition comprises a step of producing a modified epoxy resin by reacting an epoxy resin having at least one or more hydroxyl group with an isocyanate compound or an amine compound having at least one or more hydroxyl group in the presence of an alcohol, and preparing the modified epoxy resin solution by mixing the modified epoxy resin and a dilution solution In this case, the epoxy resin having at least one or more hydroxyl group may be selected from the group consisting of bisphenol-A epoxy resin, bisphenol-F epoxy resin, bisphenol-S epoxy resin, phenol novolak resin, cresol novolak epoxy resin, bisphenol-A novolak epoxy resin, bisphenol-F novolak epoxy resin, alicyclic epoxy resin, glycidyl ester epoxy resin, glycidyl amine epoxy resin, hydantoin epoxy resin, isocyanurate epoxy resin, aliphatic chain epoxy resin, and phenoxy resin, and preferably phenoxy resin. Since the phenoxy resin has a number of hydroxyl groups in its molecule, it can form an isocyanate group, a cyanate ester group, or an oxazolidone ring by reacting with an isocyanate compound or an amino alcohol compound. The phenoxy resin is not particularly limited, and may be bisphenol-A phenoxy resin, bisphenol-A/bisphenol-F phenoxy resin, brominated phenoxy resin, phosphorus-based phenoxy resin, bisphenol-A/bisphenol-S phenoxy resin, caprolactone modified phenoxy resin, siloxane modified phenoxy resin, and so forth. Considering eco-friendly, compatibility, curability, phenoxy resin is preferably bisphenol-A phenoxy resin.

In addition, if isocyanate compound used in manufacturing the modified epoxy resin contains isocyanate group, it is not particularly limited. Preferably, the isocyanate compound may be selected from the group consisting of methane-di-isocyanate, butane-1,1,-di-isocyanate, ethane-1,2,-di-isocyanate, butane-1,2,-di-isocyanate, trans-vinyl-di-isocyanate, heptane-1,7-di-isocyanate, 2,2-dimethyl-pentane-1,5,di-5-isocyanate, hexane-1,6-di-isocyanate, octane-1,8-di-isocyanate-nonane-1,9-di-isocyanate, di-methyl-silane-di-isocyanate, di-phenylsilane-di-isocyanate, cycicohexane-1,4-di-isocyanate, di-cyclo-hexyl-methane-4,4-di-isocyanate, and mixture thereof.

Also, the amine compound having at least one or more hydroxyl group used in manufacturing the modified epoxy resin may be selected from an amino alcohol compound. The amine compound used for manufacturing the modified epoxy resin is not particularly limited, and may be selected from the group consisting of di-methanol-amine, di-ethanol-amine, di-propanol-amine, di-butanol-amine, di-pentanol-amine, di-hexanol-amine, di-heptanol-amine, di-octanol-amine, di-isopropanol-amine, di-isobutanol-amine, di-sec-butanol-amine, N,N-di-methyl-ethanol-amine, 3-di-methyl-amino-1-propanol, 1-di-methyl-amino-2-propanol, 2-(2-amino-ethoxy)-ethanol, N,N-di-methyl-amino-ethyl-N'-methyl ethanol amine, 2-(methyl-amino)-ethanol, 4,6-di-hydroxy-pyrrimidine, 2,4-di-amino-6-hydroxy pyrimidine, 2-phenyl-amino-3-(2-hydroxy ethyl)-oxazolidin, N-(2-hydroxy ethyl)-2-methyl-tetra-hydro-pyrrimidine, N-(2-hydroxy-ethyl)-imidazol, 2,4-bis-(N-methyl-2-hydroxy-ethyl-amino)-6-phenyl-1,3,5-triazine, bis-(di-methyl-amino-propyl), and amino-2-propanol. In the present invention, amine compound having at least one or more hydroxyl group in manufacturing modified epoxy resin is preferable tertiary amine compound for reaction with epoxy resin.

The amine compound having the isocyanate compound or at least one or more hydroxyl group is reacted with hydroxyl group of the epoxy resin to form at least one or more isocyanate group, cyanate ester group, or oxazolidone ring in molecules of the epoxy resin. In this case, it is preferable that the epoxy resin is modified in the presence of alcohol. At this time, the alcohol is performed as reaction solvent and preferably, performed to block reaction between the same functional groups or different functional groups such as isocyanate group, cyanate ester group, or oxazolidone ring, which are formed in the epoxy resin. A kind of alcohol used in the modified reaction of the epoxy resin is not particularly limited. For example, the alcohol may be selected from methanol, ethanol, n-propanol, isopropyl alcohol, n-butanol, hexanol, nonanol, cyclo hexanol, benzyl alcohol, 2-methoxy-ethanol, 2-butoxy-ethanol, α-terpinol, benzyl alcohol, 2-hexyldecanol, 3-methoxy propanol, ethylene glycol, propylene glycol, diethylene glycol, di-propylene glycol, tri-ethylene glycol, hexylene glycol, 1,5-pentanediol, ethylene-glycol mono-ethyl-ether, ethylene-glycol mono-butyl-ether, di-ethylene-glycol mono-methyl-ether, di-ethylene-glycol mono-ethyl-ether, di-ethylene-glycol mono-butyl-ether, propylene-glycol mono-methyl-ether, propylene-glycol mono-ethyl-ether, propylene-glycol mono-butyl-ether, di-propylene-glycol mono-methyl-ether, di-propylene-glycol mono-ethyl-ether, di-propylene-glycol mono-butyl-ether, di-ethylene-glycol di-methyl-ether, di-propylene-glycol di-methyl-ether, butyl-glycolate, butyl-glycolate, di-acetone alcohol, phenyl carbinol, and methyl-phenyl carbinol. Also, the alcohol used in the modified reaction of the epoxy resin is preferably polyhydric alcohol like ethylene glycol, propylene glycol, diethylene glycol, di-propylene glycol, tri-ethylene glycol, hexylene glycol, 1,5-pentanediol, ethylene-glycol mono-ethyl-ether, ethylene-glycol mono-butyl-ether, di-ethylene-glycol mono-methyl-ether, di-ethylene-glycol mono-ethyl-ether, di-ethylene-glycol mono-butyl-ether, propylene-glycol mono-methyl-ether, propylene-glycol mono-ethyl-ether, propylene-glycol mono-butyl-ether, di-propylene-glycol mono-methyl-ether, di-propylene-glycol mono-ethyl-ether, di-propylene-glycol mono-butyl-ether, di-ethylene-glycol di-methyl-ether, and di-propylene-glycol di-methyl-ether.

The reaction for obtaining the modified epoxy resin is performed at a temperature ranging from 40 to 90° C., preferably 45 to 85° C. for about 2 to 24 hours, preferably about 4 to 12 hours.

Preparing Modified Urethane Resin Solution

The step of preparing the modified urethane resin according to the method for manufacturing the adhesive composition comprises a step of producing a modified urethane resin by reacting a urethane resin having the isocyanate group at its end with a compound having an ethylenically-unsaturated group, and preparing the modified urethane resin solution by mixing the modified urethane resin and a dilution solution.

At this time, the urethane resin having isocyanate group at its terminals refers to a resin formed by polymerizing at least one poly-isocyanate and at least one polyol.

A kind of the poly-isocyanate forming the urethane resin according to the present invention is not particularly limited, and may be aliphatic di-isocyanate such as aliphatic poly-isocyanate, cyclo-aliphatic poly-isocyanate, aralipahtic poly-isocyanate, and aromatic poly-isocyanate. Examples of the aliphatic poly-isocyanate may be tri-methylene di-isocyanate, tetra-methylene di-isocyanate, hexa-methylene di-isocyanate, penta-methylene di-isocyanate, 1,2-propylene di-isocyanate, 1,2-butylene di-isocyanate, 2,3-butylene di-isocyanate, 1,3-butylene di-isocyanate, 2,4,4- or 2,2,4-tri-methyl hexa-methylene di-isocyanate, 2,6-di-isocyanate, 2,6-di-isocyanate methyl-caproate, and 1,12-dodeca-methylene di-isocyanate and aliphatic tri-isocyanate such as lysine-ester tri-isocyanate, 1,4,8-tri-isocyanate octane, 1,6,11-tri-isocyanate undecan, 1,8-di-isocyanate-4-isocyanate methyl-octane, 1,3,6-tri-isocyanate hexane, and 2,5,7-tri-methyl-1,8-di-isocyanate-5-isocyanate octane. Also, examples of the cycloaliphatic poly-isocyanate may be 1,3-cyclo-pentene di-isocyanate, 1,4-cyclo-hexane di-isocyanate, 1,3-cyclo-hexane di-isocyanate, 3-isocyanate-methyl-3,5,5-tri-methyl cyclo-hexyl isocyanate (usual name: isophorone di-isocyanate), 4-4'-methylenebis (cyclo-hexyl isocyanate), methyl-2,4-cyclo-hexane di-isocyanate, methyl-2,6-cyclo-hexane di-isocyanate, 1,3- or 1,4-bis(iso-cyanate methyl) cyclo-hexane (usual name: hydrogenated xylene di-isocyanate) or mixture thereof, cycloaliphatic di-isocyanate such as norbornane di-isocyanate and cycloaliphatic tri-isocyanate such as 1,3,5-tri-isocyanate cyclo-hexane, 1,3,5-tri-methyl isocyanate cyclo-hexane, 2-(3-isocyanate propyl)-2,5-di(isocyanate methyl)-bicyclo(2.2.1) heptane, 2-(3-isocyanate propyl)-2,6-di(isocyanate methyl)-bicyclo(2.2.1)heptane, 3-(3-isocyanate propyl)-2,5-di (isocyanate methyl)-bicyclo(2.2.1)heptane, 5-(2-isocyanate ehtyl)-2-isocyanate methyl-3-(3-isocyanate propyl)-bicyclo (2.2.1)heptane, 6-(2-isocyanate ethyl)-2-isocyanate methyl-3-(3-isocyanate propyl)-bicyclo(2.2.1)heptane, 5-(2-isocyanate ethyl)-2-isocyanate methyl-2-(3-isocyanate propyl)-bicyclo(2.2.1)heptane, and 6-(2-isocyanate ethyl)-2-isocyanate methyl-2-(3-isocyante propyl)-bicyclo(2.2.1) heptane. Also, the aralipahtic poly-isocyanate may be aromatic di-isocyanate such as 1,3- or 1,4 xylene i-isocyanate or mixture thereof, or ω,ω'-di-isocyanate-1,4-diethyl-bezene, 1,3- or 1,4-bis(1-isocyanate-1-methylethyl)benzene (usual name: tetra-methyl xylene di-isocyanate) or mixture thereof, and aralipahtic tri-isocyanate such as 1,3,5-tri-isocyanate methylbenzene. And, examples of aromatic poly-isocyanate are m-phenylene di-isocyanate, p-phenylene di-isocyanate, 4,4'-di-phenylene di-isocyanate, 1,5-naphthalene di-isocyanate, 2,4'- or 4,4'-di-phenyl methane di-isocyanate or mixture thereof, 2,4- or 2,6-tolylene di-isocyanate or mixture thereof, aromatic di-isocyanate such as 4,4'-toluidine di-isocyanate, 4,4'di-phenyl ether di-isocyanate, aromatic tri-isocyanate such as tri-phenyl methane-4, 4',4"-tri-isocyanate, 1,3,5-tri-isocyanate benzene, and 2,4,6-tri-isocyanate toluene, and aromatic tetra-isocyanate such as 4,4'-di-phenyl methane-2,2',5,5'-tetra-isocyanate. These poly-isocyanates may be used alone, or two or more thereof may be used in combination.

The polyol forming the urethane resin is a general term of poly-hydroxy compound, which can be obtained by substituting a number of hydrogen of hydrocarbon with hydroxyl groups. If the polyol is a compound having two or more active hydrogens, its kind is not particularly limited. Specific examples of the polyol are small molecular alcohol such as ethylene glycol, propylene glycol, butadiol, di-ethylene glycol, glycerol, hexane-triol, tri-methylol propane, and pentaerythritol, poly-ether polyol (for example, poly-tetra-methylene glycol, poly-ethylene glycol, poly-propylene glycol, poly-oxi-propylene-diol, poly-oxi-propylene-triol, poly-oxi-butylene glycol, block copolymer between different alkylene-oxide), poly-olefin polyol (for example, poly-butadien polyol and poly-isoprene polyol), poly-tetra methylene oxide glycol (PTMG), adipate polyol, lactone polyol, and polyester polyol. The polyester polyol can be obtained by esterified condensation reaction of acid having two carboxyl groups such as oxalic acid, malonic acid, succinic acid, glutaric acid, adipic acid, maleic acid, fumaric acid, phthalic acid, and terephthalic acid and glycol having two hydroxyl group such as ethylene glycol, propylene glycol, butylene glycol, neophentyl glycol, and hexa-methylene glycol.

The compound having ethylenically unsaturated group, which is used in manufacturing the modified urethane resin, is not limited to any particular compound if it has ethylenically double bond. This compound may be selected from acrylic acid, methacylic acid, itaconic acid, fumaric acid, methyl acrylate, ethyl acrylate, butyl acrylate, ethylhexyl acrylate, ethylhexyl methacrylate, lauryl methacrylate, hydroxylethyl acrylate, hydroxy-propyl acrylate, hydroxy-butyl acrylate, stylene, methyl methacrylate, ethyl methacrylate, butyl methacrylate, acrylonitrile, methacrylonitrile, isobornyl acrylate, isobornyl methacrylate, hydroxy-ethyl methacrylate, hydroxy-propyl methacrylate, hydroxy-butyl methacrylate, hydroxy-pentyl acrylate, hydroxy-pentyl methacrylate, hydroxy-hexyl acrylate, hydroxy-hexyl methacrylate, vinyl toluene, vinyl acetate, and vinyl chloride. Preferably, the compound has the acryloyl group or the methacryloyl group. Also, considering reactivity with the urethane resin, the compound preferably has at least one or more hydroxyl group in molecules. For instance, the compound may be selected from hydroxy-ethyl acrylate, hydroxy-propyl acrylate, hydroxy-butyl acrylate, hydroxy-ethyl methacrylate, hydroxy-propyl methacrylate, hydroxy-butyl methacrylate, hydroxy-pentyl acrylate, hydroxy-pentyl methacrylate, hydroxy-hexyl acrylate, and hydroxy-hexyl methacrylate.

In the present invention, if carboxyl acid is employed as the compound having the ethylenically unsaturated group, the carboxyl acid is reacted with the hydroxyl group of urethane resin to form the ethylenically unsaturated group in the urethane resin. Also, if a hydroxy alkyl acrylate or hydroxy alkyl methacrylate is employed as the compound having the ethylenically unsaturated group, the hydroxyl group is reacted with isocyanate group at terminals of the urethane resin to form the ethylenically unsaturated group thereat.

The reaction for obtaining the modified urethane resin is performed at a temperature ranging from 40 to 90° C., preferably 50 to 85° C. for about 2 to 24 hours, preferably about 4 to 12 hours.

Manufacturing a First Composition

The step of manufacturing the first composition according to the method for manufacturing the adhesive composition comprises a step of mixing the modified epoxy resin solution and the modified urethane resin or forming the reaction product by mixing. In this case, the modified epoxy resin solution and the modified urethane resin solution in the (c) step are mixed for the weight ratio of the modified epoxy resin versus the modified urethane resin to be preferably 9:1 to 6:4, more preferably 9:1 to 7:3.

In the adhesive composition according to the present invention, the modified epoxy resin and the modified urethane resin may be mixture form, which has been dispersed homogeneously, or preferably mutually coupled. For example, the modified urethane resin may have been coupled with the modified epoxy resin through the hydroxyl group or the epoxy group in the modified epoxy resin. Also, the modified urethane resin may have been coupled with the modified epoxy resin through isocyanate group, cyanate ester group, or oxazolidone ring in the modified epoxy resin.

The reaction for coupling the modified urethane resin with the modified epoxy resin is performed at a temperature ranging from 15 to 100° C., preferably 20 to 90° C., and more preferably 70 to 90° C. for about 2 to 24 hours, preferably about 4 to 12 hours.

Manufacturing a Second Composition

The step of manufacturing the second composition according to the method for manufacturing the adhesive composition comprises a step of producing the second composition by adding and mixing an inorganic filler in nanoparticle form to the first composition. In this case, a kind of the inorganic filler is not particularly limited. For instance, the inorganic filler may be selected from the group consisting of silica, calcium carbonate, aluminum hydroxide, magnesium hydroxide, titania, alumina, and zirconia. Considering compatibility and reaction with epoxy resin and urethane resin, the inorganic filler is preferably silica. In addition, the particle size of the silica is preferably less than 20 nm (for example, 1~20 nm), and more preferably 10 nm (for example, 1~10 nm).

Preferably, the content of the modified epoxy resin in the second composition is ranged from 15 to 45% by weight, and more preferably, 20 to 40% by weight.

Preferably, the content of the modified urethane resin in the second composition is ranged from 2 to 20% by weight, and more preferably, 2 to 10% by weight.

Preferably, the content of the inorganic filler in nanoparticle form of the second composition is ranged from 0.1 to 4% by weight, and more preferably, 0.5 to 2% by weight.

Hereinafter, the present invention will be descried more concretely through embodiments. However, the embodiments are intended to be exemplary for clarifying technology and do not limit the scope of the invention.

1. Manufacturing Epoxy Resin

Example 1

Bis-phenol A and epichlorohydrin were mixed in the molar ratio of 2:3. Sodium hydroxide aqueous solution was added to the mixture, and then condensation reaction was performed at a temperature of 80° C. to form bis-phenol A epoxy resin. Salicylic acid equivalent to 1 mole of the bis-phenol A was dissolved in the ethanol to form salicylic solution. After that, the salicylic solution was added in a beaker in which the bis-phenol A epoxy resin was contained, and reacted at a temperature of 80° C. to form bis-phenol A phenoxy resin. Then, by removing the solvent in the beaker, solid bis-phenol A phenoxy resin was obtained. Then, a bis-phenol A phenoxy resin solution was formed by mixing 35 parts by weight of the solid bis-phenol A phenoxy resin, 45 parts by weight of N-methyl-2-pyrrolidone (NMP), 15 parts by weight of methyl ethyl ketone, and 5 parts by weight of supplement additive.

Example 2

Bis-phenol A and epichlorohydrin were mixed in the molar ratio of 2:3. Sodium hydroxide aqueous solution was added to the mixture, and then condensation reaction was performed at a temperature of 80° C. to form bis-phenol A epoxy resin. Salicylic acid equivalent to 1 mole of the bis-phenol A was dissolved in the ethanol to form salicylic solution. After that, the salicylic solution was added in a beaker in which the bis-phenol A epoxy resin was contained, and reacted at a temperature of 80° C. to form bis-phenol A phenoxy resin. N,N-dimethyl-2-amino-ethanol equivalent to 0.5 mole of the bis-phenol A was dissolved in di-propylene glycol with concentration of 20 weight % to form N,N-dimethyl-2-amino ethanol solution. After that, N,N-dimethyl-2-amino ethanol was dropped in a beaker in which the bis-phenol A phenoxy resin was contained, and reacted at a temperature of 50° C. to form the modified epoxy resin having isocyanate group. Then, by removing the solvent in the beaker, solid modified epoxy resin was obtained. Then, a modified epoxy resin solution was formed by mixing 35 parts by weight of the solid modified epoxy resin, 45 parts by weight of N-methyl-2-pyrrolidone (NMP), 15 parts by weight of methyl-ethyl ketone, and 5 parts by weight of supplement additive.

2. Manufacturing Urethane Resin

Example 3

11 parts by weight of hexa-methylene di-isocyanate, 100 parts by weight of hydrogenated polybutadiene diol, 60 parts by weight of toluene, and 0.1 parts by weight of methyl-ether hydroquinone were injected and stirred in a reactor. After that, the temperature of the reactor was raised to 85° C. and they were reacted for about 2 hours to form urethane resin. Then, by removing solvent in the reactor, solid urethane resin was obtained. Then, a urethane resin solution was formed by mixing 24.1 parts by weight of the solid modified urethane resin, 10.3 parts by weight of methyl-ethyl ketone, 55.2 parts by weight of cyclohexanone, 4.8 parts by weight of N,N-dimethyl formic amide, 3.4 parts by weight of propylene glycol methyl-ether acetate, and 2.1 parts by weight of supplement additive.

Example 4

11 parts by weight of hexa-methylene di-isocyanate, 100 parts by weight of hydrogenated polybutadiene diol, 60 parts by weight of toluene, and 0.1 parts by weight of methyl ether hydroquinone were injected and stirred in a reactor. After that, the temperature of the reactor was raised to 85° C. and they were reacted for about 2 hours to form urethane resin. Then, 7 parts by weight of 2-hydroxy-ethyl acrylate was injected in the reactor in which urethane resin was soaked and reacted at a temperature of 85° C. about 3 hours to form modified urethane resin having ethylenically unsaturated group. Then, by removing solvent in the reactor, solid modified urethane resin was obtained. Then, a modified urethane resin solution was formed by mixing 24.1 parts by weight of the solid modified urethane resin, 10.3 parts by weight of methyl-ethyl ketone, 55.2 parts by weight of cyclohexanone, 4.8 parts by weight of N,N-dimethyl formic amide, 3.4 parts by weight of propylene glycol methyl-ether acetate, and 2.1 parts by weight of supplement additive.

3. Manufacturing Adhesive for Hydrophobic or Water-Repellent Substrate

Example 5

The modified epoxy resin solution obtained from Example 2 and the modified urethane resin solution obtained from Example 4 were added for the weight ratio the modified epoxy resin versus the modified urethane resin to be 8:2 in a reactor and stirred at a temperature of about 20° C. for about 4 hours, and thereby the composition was obtained. After that, 2 part by weight of a silica dispersion (product name: Nanosil® 8030 manufactured by the Nanosil Asia Pacific, technical feature: an amorphous silica having a particle size of less than about 10 nm is dispersed in butyl acetate solvent with about 50% parts by weight of concentration) was added and mixed to 100 parts by weight of composition, and thereby the adhesive was obtained.

Example 6

The modified epoxy resin solution obtained from Example 2 and the modified urethane resin solution obtained from Example 4 were added for the weight ratio the modified epoxy resin versus the modified urethane resin to be 8:2 in a reactor and stirred at a temperature of about 80° C. for about 4 hours, and thereby the composition was obtained. Due to this reaction, the modified urethane resin was coupled to the modified epoxy resin by isocyanate group of the modified epoxy resin. After that, 2 part by weight of a silica dispersion (product name: Nanosil® 8030 manufactured by the Nanosil Asia Pacific, technical feature: an amorphous silica having a particle size of less than about 10 nm is dispersed in butyl acetate solvent with about 50% parts by weight of concentration) was added and mixed to 100 parts by weight of composition, and thereby the adhesive was obtained.

Example 7

The epoxy resin solution obtained from Example 1 and the urethane resin solution obtained from Example 3 were added for the weight ratio the epoxy resin versus the urethane resin to be 8:2 in a reactor and reacted at a temperature of about 80° C. for about 4 hours, and thereby the adhesive was obtained.

Example 8

The epoxy resin solution obtained from Example 1 and the urethane resin solution obtained from Example 3 were added for the weight ratio the epoxy resin versus the urethane resin to be 8:2 in a reactor and reacted at a temperature of about 80° C. for about 4 hours, and thereby the adhesive was obtained. After that, 2 part of weight of a silica dispersion (product name: Nanosil® 8030 manufactured by the Nanosil Asia Pacific, technical feature: an amorphous silica having a particle size less than about 10 nm is dispersed in butyl acetate solvent with about 50% parts by weight of concentration) was added and mixed to 100 parts by weight of composition, and thereby the adhesive was obtained.

4. Testing Properties of Adhesive

The coating property, drying time after coating, and adhesion of the modified epoxy resin solution obtained from Example 2, the modified urethane resin solution obtained from Example 4, and the adhesive obtained from Examples 5 to 7 were measured.

(1) Coating Property

The adhesive composition was coated with a thickness of about 6 μm by a bar coater on a water-repellent nylon fabric having contact angle of 135°. The grade of coating property was decided by observing and relatively comparing the degree of homogeneous spread of the adhesive by visible inspection in coating the adhesive using the bar coater as follows:

⊚: The Best; ○: Good; Δ: Fair; ×: Poor

The test with respect to hydrophobic nylon fabric having contact angle of 115° was performed in the same way.

(2) Drying Time after Coating

The adhesive composition was coated with a thickness of about 6 μm by a bar coater on a water-repellent nylon fabric having contact angle of 135°. Then, the fabric was dried in an oven at a temperature of 80° C. The drying time of the adhesive was set until the adhesion of adhesive was completely disappeared, and measured.

The test with respect to hydrophobic nylon fabric having contact angle of 115° was performed in the same way.

(3) Adhesion

The adhesive composition was coated with a thickness of about 6 μm by a bar coater on a water-repellent nylon fabric having contact angle of 135°. Then, after the same fabric was put on the adhesive layer and a predetermined pressure was applied, they were sufficiently left and dried. Then, 180° peel shear adhesion strength with respect to the sample, which comprising the lower fabric, the adhesive layer, and the upper fabric, was measured using Instron Universal Testing Machine.

The test with respect to hydrophobic nylon fabric having contact angle of 115° was performed in the same way.

(4) Property Test Result of Adhesive

The results of the adhesive composition tested by using the water-repellent nylon fabric having contact angle of 135° was shown in Table 1. In addition, the results of the adhesive composition tested by using the hydrophobic nylon fabric having contact angle of 115° was shown in Table 2.

TABLE 1

| Classification | Coating | Drying Time After coating (Min) | Adhesion (N) |
|---|---|---|---|
| Example 2 | Δ | >30 | 2.6~4 |
| Example 4 | ◯ | 2~3 | <2 |
| Example 5 | ◯ | 5~7 | 6~7 |
| Example 6 | ◯ | 5~7 | 6.5~8 |
| Example 7 | ◯ | 8~10 | 4~6 |
| Example 8 | ◯ | 8~10 | 4~6 |

TABLE 2

| Classification | Coating | Drying Time After coating (Min) | Adhesion (N) |
|---|---|---|---|
| Example 2 | Δ | >30 | 3~5 |
| Example 4 | ◯ | 2~3 | <2 |
| Example 5 | ◯ | 5~7 | 7~9 |
| Example 6 | ◯ | 5~7 | 7~9 |
| Example 7 | ◯ | 8~10 | 4~6 |
| Example 8 | ◯ | 8~10 | 4~6 |

As shown in Tables 1 and 2, when the adhesive composition only comprises the modified epoxy resin having isocyanate group (See Example 2), it was shown that the coating property, drying property, and adhesion were relatively poor. Additionally, when the adhesive composition only comprises the modified epoxy resin having ethylenically unsaturated group (See Example 4), it was shown that the coating property and drying property were a little good, but the adhesion was significantly poor. When the adhesive composition comprises the reaction product of general epoxy resin and urethane resin (See Examples 7 and 8), it was shown that the coating property was a little good, but the drying property and adhesion were relatively poor. On the other hand, when the adhesive composition comprises the modified epoxy resin having isocyanate group and the modified urethane resin having ethylenically unsaturated group, or the reaction product of the modified epoxy resin having isocyanate group and the modified urethane resin having ethylenically unsaturated group (See Examples 5 and 6), it was shown that all of the coating property, drying property, and adhesion were good.

According to the present invention, the same or different materials can be adhered or a pattern can be printed on a substrate having hydrophobic or water-repellent surface. For example, it is useful to impart a new functionality or three-dimensional effect on Gore-tex® substrate through various printing or coating techniques such as a screen printing, a gravure coating, and a spray coating. Also, the adhesive according to present invention has excellent coating property and short dry time after coating, thereby can improve workability. Furthermore, there is no need for surface modification with regard to hydrophobic or water-repellent surface of fabrics or plastics, and inherent characteristics of raw materials can be maintained as it is.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An adhesive composition for hydrophobic or water-repellent substrates comprising a resin, an inorganic filler in nanoparticle form, and at least one dilution solvent;
    wherein the resin is a mixture of or a reaction product of:
        a modified epoxy resin and a modified urethane resin;
    wherein the modified urethane resin has an ethylenically-unsaturated group at its end; and
    wherein the modified epoxy resin comprises one or more of an isocyanate group, a cyanate ester group, and an oxazolidone ring.

2. The adhesive composition of claim 1, wherein the modified epoxy resin is a modified phenoxy resin comprising one or more of an isocyanate group, a cyanate ester group, and an oxazolidone ring.

3. The adhesive composition of claim 1, wherein the ethylenically-unsaturated group is an acryloyl group or a methacryloyl group.

4. The adhesive composition of claim 1, wherein the resin is said reaction product; and the modified epoxy resin and the modified urethane resin are coupled to each other through the one or more of the isocyanate group, the cyanate ester group or the oxazolidone ring in the modified epoxy resin.

5. The adhesive composition of claim 1, wherein the inorganic filler is a silica having a particle size of less than about 20 nm.

6. The adhesive composition of claim 1, wherein the modified epoxy resin and the modified urethane resin are present in the resin at a weight ratio of 9:1 to 6:4.

7. The adhesive composition of claim 1, wherein the modified epoxy resin accounts for about 15 to 45% by weight of the adhesive composition, the modified urethane resin accounts for about 2 to 20% by weight of the adhesive composition, and the inorganic filler in nanoparticle form accounts for about 0.1 to 4% by weight of the adhesive composition.

8. A method of manufacturing the adhesive composition of claim 1, the method comprising the steps of:
    (a) producing the modified epoxy resin by reacting an epoxy resin having one or more hydroxyl groups with an isocyanate compound or an amine compound having one or more hydroxyl groups in the presence of an alcohol, and preparing a modified epoxy resin solution by mixing the modified epoxy resin and a dilution solvent;
    (b) producing the modified urethane resin by reacting an urethane resin having an isocyanate group at its end with a compound having an ethylenically-unsaturated group, and preparing a modified urethane resin solution by mixing the modified urethane resin and a dilution solvent;

(c) producing a first composition by mixing the modified epoxy resin solution and the modified urethane resin solution, and optionally reacting the modified epoxy resin and the modified urethane resin; and (d) producing the adhesive composition by adding and mixing the inorganic filler in a nanoparticle form to the first composition.

9. The method of claim 8, wherein the epoxy resin having one or more hydroxyl groups in the (a) step is a phenoxy resin.

10. The method of claim 9, wherein the phenoxy resin is a bisphenol-A type phenoxy resin.

11. The method of claim 8, wherein the amine compound in the (a) step is a tertiary amine compound.

12. The method of claim 8, wherein the alcohol in the (a) step is a polyhydric alcohol.

13. The method of claim 8, wherein the ethylenically-unsaturated group in the (b) step is an acryloyl group or a methacryloyl group.

14. The method of claim 8, wherein the inorganic filler in the (c) step is a silica having a particle size of less than about 20 nm.

15. The method of claim 8, wherein the modified epoxy resin and the modified urethane resin are present in the (c) step at a weight ratio of 9:1 to 6:4.

16. The method of claim 8, wherein the modified epoxy resin and the modified urethane resin are reacted in the (c) step such that they are coupled to each other through the one or more of the isocyanate group, the cyanate ester group, or the oxazolidone ring in the modified epoxy resin.

17. The method of claim 8, wherein the modified epoxy resin accounts for about 15 to 45% by weight of the adhesive composition, the modified urethane resin accounts for about 2 to 20% by weight of the adhesive composition, and the inorganic filler in nanoparticle form accounts for about 0.1 to 4% by weight of the adhesive composition.

* * * * *